United States Patent [19]
Palecek

[11] 3,829,955
[45] Aug. 20, 1974

[54] ONE PIECE FREE STANDING TERMINAL

[75] Inventor: Vincent James Palecek, Cicero, Ill.

[73] Assignee: Bunker Ramo Corporation, Oak Brook, Ill.

[22] Filed: Feb. 23, 1973

[21] Appl. No.: 335,230

Related U.S. Application Data

[62] Division of Ser. No. 223,472, Feb. 4, 1972, Pat. No. 3,768,068.

[52] U.S. Cl. .................... 29/401, 29/426
[51] Int. Cl. .................... B23p 7/00
[58] Field of Search ........... 113/119, 1 R; 29/630 D, 29/401 R, 426; 339/221; 72/358

[56] References Cited

UNITED STATES PATENTS

| | | | |
|---|---|---|---|
| 650,861 | 6/1900 | McTighe | 339/277 |
| 3,223,960 | 12/1965 | Ruehlemann | 29/630 D |
| 3,566,660 | 3/1971 | Dedek | 113/119 |
| 3,669,054 | 6/1972 | Desso et al. | 113/119 |

*Primary Examiner*—Richard J. Herbst
*Attorney, Agent, or Firm*—N. Cass; F. M. Arbuckle

[57] ABSTRACT

The invention relates to a one-piece free standing terminal adapted for use with a circuit board having a terminal receiving opening formed therein. The terminal consists of a contact portion having a single pair of bows bent to form a lead receiving funnel terminating in a contact throat, a seating flange, a resilient neck connecting the contact portion to the seating flange, a terminal retention area and a tail extending from the terminal retention area and adapted to have a conductor connected thereto. The terminal retention area is shaped to coact with the terminal receiving opening in the board to frictionally retain the terminal in the board. In order to permit the terminal to be withdrawn and reinserted in the board the terminal retention area may have a non-symmetric cross-section or a fixture may be provided to permit at least one dimension of the terminal retention area to be expanded in the field. The terminal may be constructed from two like blanks bent into an overlaying relationship with each other or it may be formed from dual thickness material.

3 Claims, 9 Drawing Figures

ONE PIECE FREE STANDING TERMINAL

This is a division of application Ser. No. 223,472, filed Feb. 4, 1972, now U.S. Pat. No. 3,768,068.

This invention relates to circuit board terminals, and more particularly to a one piece, free standing terminal adapted for insertion into an opening in a circuit board.

In most applications where a non-discreet component such as a dual in line package (DIP) or a discreet component such as a transistor, resistor, or capacitor is mounted on a circuit board, the mounting is accomplished by passing the leads of the component through corresponding small holes in the board, soldering the leads on the back side of the board, then clipping excess leads. Mounting components in this way has a number of disadvantages. First, it is virtually impossible to remove the component from the board for testing or replacement without destroying the component, and frequently the board as well. It is therefore extremely difficult to perform service on these boards or to perform desired board modifications, and it is virtually impossible to service or modify these boards in the field.

A second problem stems from the fact that the holes in which the leads are inserted are very small, generally being just slightly larger than the size of the leads themselves. The small size of these holes makes component insertion a difficult operation whether it is performed by hand or mechanically. In particular, even the slightest bend or other distortion in a lead may make insertion of the lead impossible. An expensive lead straightening operation is thus frequently required prior to component insertion.

Finally, the requirement of soldering the component leads to the underside of the board creates additional problems. Because of the density of the leads and their small size, manual soldering of the leads is an extremely difficult and expensive process. Mechanical soldering of the leads as with a wave soldering machine, requires expensive premasking and post cleaning steps. Further, with either mechanical or manual soldering, it is possible for a stray piece of solder to adhere to the board, causing short circuit problems, and the heat from the soldering operation may result in damage to the board or the components thereon.

It is therefore apparent that improved techniques for securing components to a circuit board are required. In recognition of this fact, some circuit board terminals have been developed. These terminals are adapted to fit in a board and to physically and electrically connect to the leads of a component. The upper area of the terminal is funnel shaped to make lead insertion easier. The portion of the terminal extending below the board is in the shape of a tail which may be attached to either by wire wrap or solder. However, since solder is applied only to a terminal tail rather than to the board itself, the likelihood of spurious connections and damage to the board are minimized.

However, these terminals, while solving many of the problems indicated above, have heretofore suffered some deficiencies of their own. First these terminals have frequently been formed of two separate pieces which are fitted together through the board. Forming the terminals in two pieces in this way has made them more expensive to fabricate and mount then would be the case with a one piece terminal. Perhaps more significantly, the two piece construction results in an electrical discontinuity which could, should the parts not mate properly, adversely affect the electrical characteristics of the terminal.

Another problem with existing board terminals is the possibility of the terminal rotating in the board during, for example, a wire wrap operation. Such rotation could cause the terminal to be improperly oriented in the board, either preventing a non-symmetric component lead from entering the terminal or causing the lead to overstress the terminal. If the lead is already in the terminal, the rotation could cause the lead to be broken off. Such rotation could, in addition, result in shortcircuit producing contact between two adjacent terminals. With a two-piece terminal, relative rotation between the terminal halfs may also occur causing, among other problems, a possible electrical discontinuity.

While removal of a terminal from the board is not normally required, there are occasions, such as when a terminal is found to be defective, where terminal removal is required. Where friction is utilized to hold the terminal in the board, the terminal-receiving opening in the board may be so distorted as to not be capable of firmly holding a terminal reinserted in the hole. While this problem might be overcome by providing replacement terminals with larger terminal retention areas, this procedure would require the expense of a separate production line and a separate inventory for replacement terminals. A scheme for permitting reinsertion of the same or a like terminal into the opening is thus required.

Another desirable feature in circuit board terminals is a means for preventing the insertion of oversized leads (or improperly oriented leads which could overstress and thus destroy a terminals contact area.

It is therefore a primary object of this invention to provide and improve circuit board terminal.

A more specific object of this invention is to provide a one piece circuit board terminal which is relatively simple and inexpensive to manufacture and install.

Another object of this invention is to provide a circuit board terminal which is not susceptible to rotation in the board.

Still another object of this invention is to provide a circuit board terminal which may be removed from the board and either reinserted in the board or have a like terminal reinserted in the board without a significant decrease in terminal holding characteristics.

Still another object of this invention is to provide a circuit board terminal with an anti-overstress feature to protect the terminal from attempts to insert oversized leads.

In accordance with these objects this invention provides a one piece, free standing terminal adapted for use with a circuit board having a terminal receiving opening formed therein. The terminal includes a contact portion having a single pair of bows bent to form a lead receiving funnel terminating in a contact throat. A seating flange is connected to the contact portion by a resilient neck. Below the seating flange is a terminal retention area shaped to coact with the terminal receiving opening in the board to frictionally retain the terminal in the board. A tail adapted to have a conductor connected thereto, extends from the terminal retention area.

The foregoing and other objects, features, and advantages of the invention will be apparent from the following more particular description of preferred embodiments of the invention as illustrated in the accompanying drawings.

DETAILED DESCRIPTION

Figures 1, 2, 3:
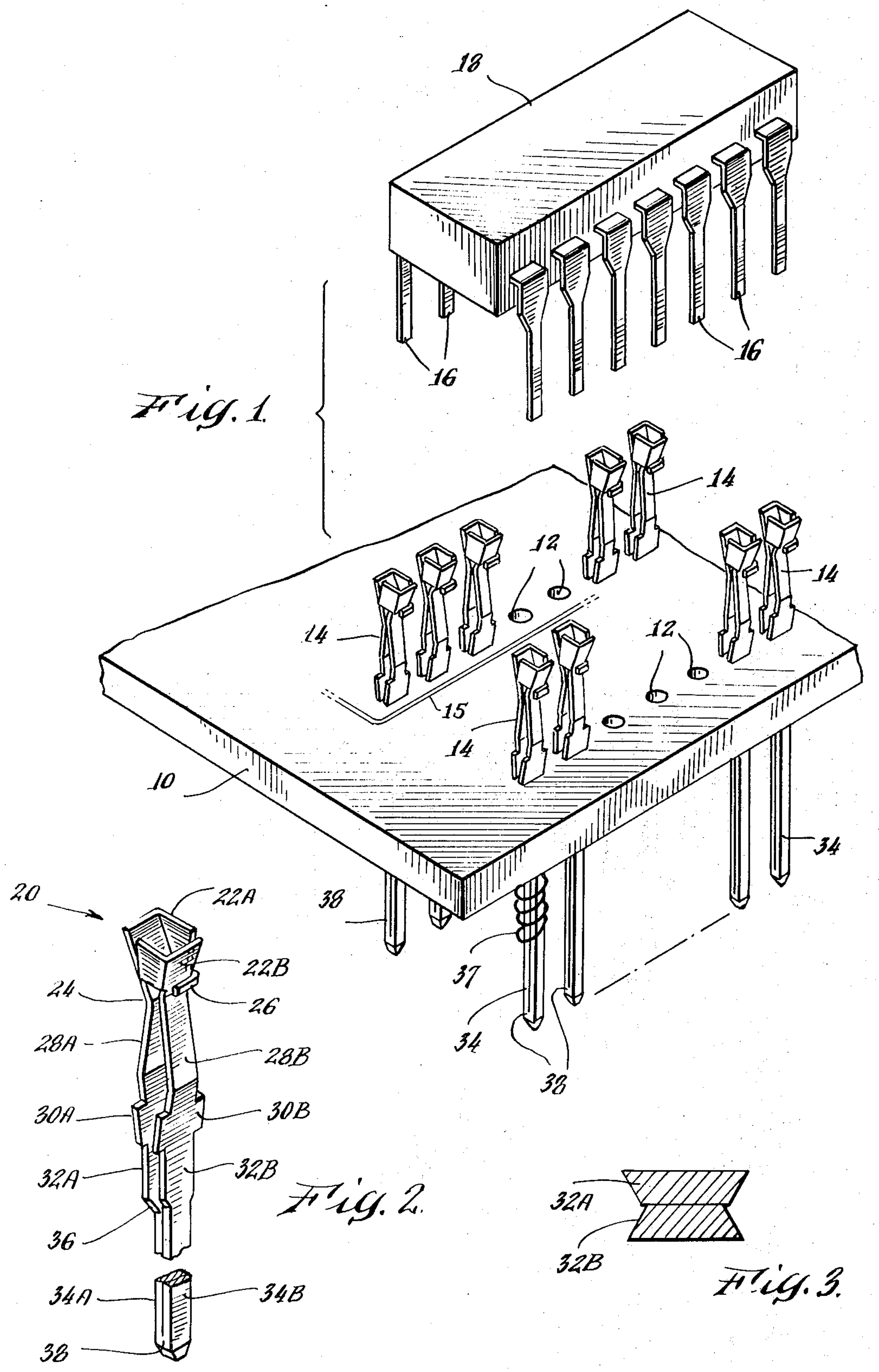
FIG. 1 is a perspective view of a circuit board employing free standing terminals of a first embodiment of the invention.
FIG. 2 is a perspective view of a terminal of the type utilized in FIG. 1.
FIG. 3 is a sectional view illustrating an alternative cross-section for the terminals retention area.

Referring first to FIG. 1, it is seen that a circuit board 10 is provided having a plurality of terminal receiving openings 12 formed therein. The board 10 may, for example, be formed of a glass epoxy material. The size and shape of the openings 12 will depend to some extent on the size and shape of a terminal retention area (to be described shortly) of a terminal 14 mounted on the board. In any event, opening 12 will, in at least one dimension, be slightly smaller than the size of the terminal so as to provide a tight pressure fit. In some applications, printed circuit wiring 15 may appear on the surface of the board and the terminals may make contact with this circuitry either by utilization of plated-through openings or by other means to be described later. The spacing between openings 12 is determined by the spacing of the leads on the components to be mounted, for example, the leads 16 of the dual in line package (DIP) 18 shown in FIG. 1.

Referring now more particularly to FIG. 2, it is seen that the one piece, free standing terminal 14 of the preferred embodiment of the invention includes a contact portion 20 which is formed of two bows 22 A and 22 B. Each bow 22 is bent approximately 45° to form two sides of a funnel-shaped, lead receiving opening which is flaired at its mouth and tapers uniformly to contact throat 24. An anti-overstressing tab 26 extends from each of the bows and is bent around behind the throat area of the other bow to limit the amount by which the throat may be opened to within the elastic limit of the material utilized. While only a single overstressing tab 26 is shown in FIGS. 1 and 2, it is to be understood that a second tab extending behind the throat area of the other bow could also be provided.

The throat or contact area 24 of each terminal is preloaded to the extent that the gap between the throat portions of the two bows is less than the thickness of a lead 16. For example, a typical throat spacing might be 1 to 4 mills. A throat spacing of this magnitude could accommodate a lead 16 up to 15 mills thick while maintaining desired normal forces and without overstressing the material.

Extending from the throat area of each bow 22 is a neck portion 28 which terminates in a seating flange 30. From FIG. 1, it can be seen that seating flanges 28 limit the extent to which the terminals may be inserted in board 10 and thus assure uniform positioning of the terminals. In addition, where there is printed circuit wiring on board 10, flanges 30 may be utilized to make physical and electrical contact with this wiring, permitting signals from the board to be conveyed to and through the components and to external wiring connected to the terminal tails.

The remaining portions of terminal 14 are terminal retention area 32 and tail 34. Terminal retention area 32 is the portion of the terminal which is positioned in an opening 12 of board 10 and functions to frictionally secure the terminal to the board. It has a tapered leading edge 36 to assist in inserting the terminal into the board and has a cross-section with distinct corners, such as for example a rectangular cross-section, so as to prevent rotation of the terminal in the board. As may be seen from FIG. 1, tail 34 extends below board 10 and may be physically and electrically connected to either by wire wrap, (see for example wire 37) in which event a longer tail is required, or by soldering a wire thereto. Either of these operations may be performed either manually or by machine, and with either method more than a single wire may be attached to each tail.

Figures 4, 5, 6, 7, 8:
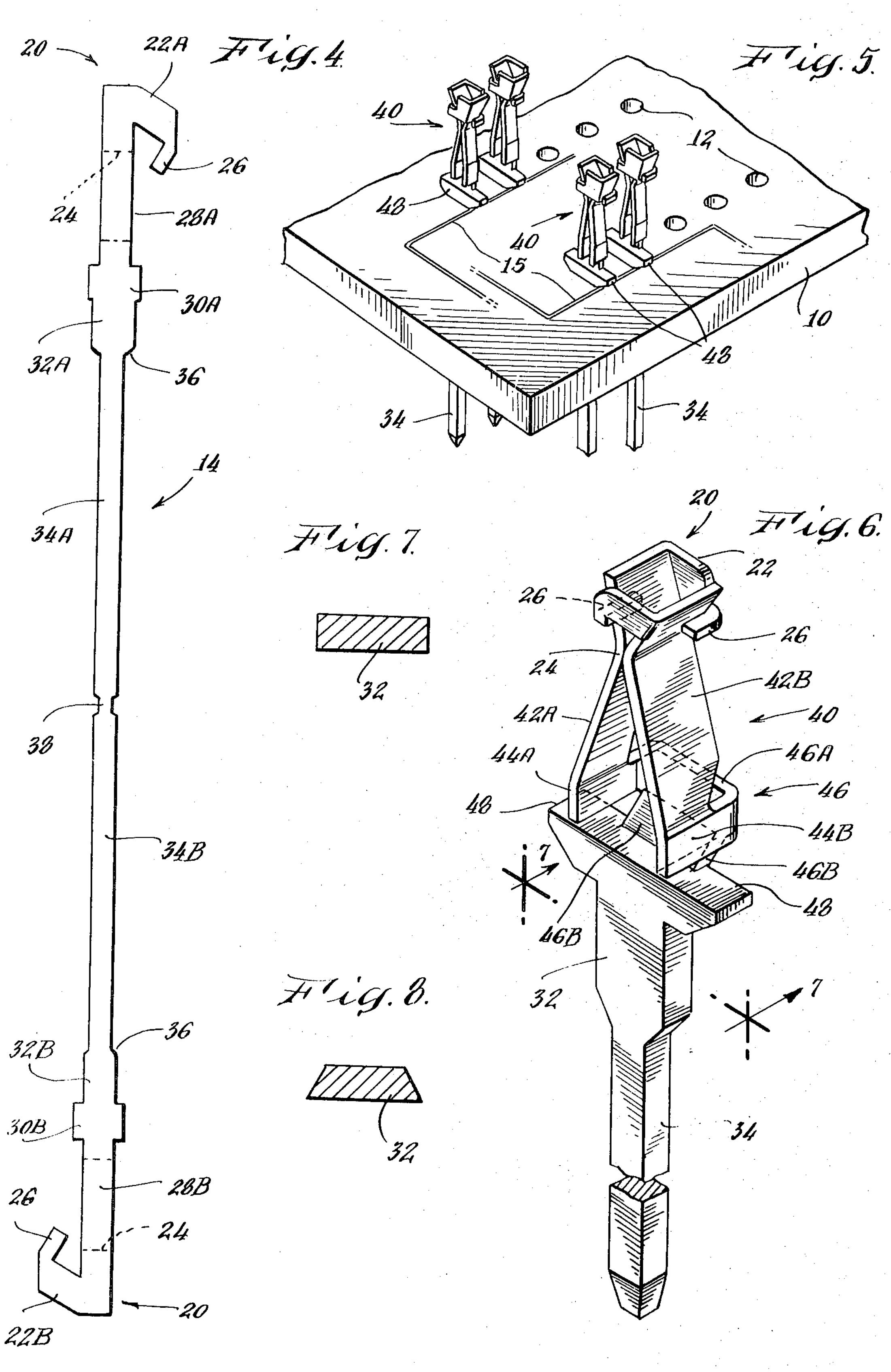
FIG. 4 is a front view of a blank suitable for use for forming a terminal of the type shown in FIG. 2.
FIG. 5 is a perspective view of a circuit board utilizing free standing terminals of a second embodiment of the invention.
FIG. 6 is a perspective view of the terminal utilized in FIG. 5.
FIG. 7 is a sectional view along the line 7—7 of FIG. 6 for a first form of the embodiment of the invention shown in FIG. 6.
FIG. 8 is a sectional view along the line 7—7 of FIG. 5 for an alternative form of the embodiment of the invention shown in FIG. 6.

FIG. 4 shows a stamped blank which may be formed into a terminal 14. The blank consists of two separate portions which are joined at a point 38 located at the tips of tail portions 34. The two blanks are folded over, one on top of the other, with the terminal retention and tail portions being in physical contact over their entire areas to form a dual thickness material, providing the required added strength in these areas. The blank is fabricated of a material having both good flexual strength and a relatively high elongation factor. A copper alloy is an example of a suitable material. This results in neck area 28 being somewhat resilient and adapted therefore to move slightly as a load is inserted into the terminal to compensate for minor misalignments of the leads. The two spaced portions of the neck area however, provide a high resistance to rotational forces exerted on the upper portion of the terminal. This, in conjunction with the shape of terminal retention area 32, provides significant resistance against terminal rotation.

FIG. 3 shows an alternative cross-section for terminal retention area 32 which provides sharper knife edges at the corners. This permits the retention area to cut cleanly into board 10 rather than broaching or removing material from the board on terminal insertion and provides even greater resistance to terminal rotation.

The terminals described above may be supplied either individually or on a carrier strip, depending on preference, for automatic insertion into circuit board 10. For the preferred embodiment of the invention shown in FIGS. 1–4, terminal retention portion 32A has been shown as being slightly larger than terminal retention portion 32B. The terminal retention area thus has a non-symmetrical cross-section. This means that if a terminal 14 is removed from the board, either because the terminal is defective or for some other reason, the same terminal may be reinserted in the board, or another like terminal may be inserted in the board, with good terminal retention and rotation resistance properties. This is accomplished by reinserting the terminal rotated 180° from its initial position so that portion 32A of the terminal retention area for the reinserted terminal is in the portion of opening 12 where portion 32B was previously located and visa versa. The larger portion 32A of the retention area is effective on this reinsertion to distort a new area of the opening, thus providing the desired frictional retention forces.

DETAILED DESCRIPTION OF EMBODIMENT OF FIGS. 5–8

Fig. 5 shows a board 10 with openings 12 having mounted therein terminals 40 of an alternative embodiment of the invention. Like elements in the embodiments of the invention shown in FIGS. 1–4 and 5–8 have been given like reference numbers in both sets of figures. Referring now more particularly to FIG. 6, it is seen that the terminal for this embodiment of the invention likewise has a funnel shaped contact area 20 which is formed from a single pair of bent bows 22 terminating in a throat area 24. Anti-overstressing tabs 26 are likewise provided with a pair of these tabs being shown for this embodiment of the invention.

The neck portion of the terminals of this embodiment of the invention is in two parts. A first portion is formed of arms 42A and 42B which extend from the corresponding bows and diverge from throat area 24, ending in substantially vertical sections 44 which are bent at an angle substantially perpendicular to that of throat portion 46. Throat portion 46 is substantially vertical in the area 46A thereof adjacent to sections 44 and is bent at about a 45° angle to the vertical in the area 46B thereof which connects the upper portion of the terminal to the lower portion of the terminal, the lower portion of the terminal starting with seating flange 48.

At this point it should be noted that the terminal for this embodiment of the invention is formed of dual thickness material. The material for the upper portion of the terminal including neck 46 is relatively thin, being for example 8 to 9 mills thick thus achieving maximum beam flexual characteristics necessary to obtain adequate normal forces upon insertion of a lead and to permit some movement of the upper portion of the terminal to compensate for slight misalignments of the leads. The lower portion of the terminal including seating flange 48 is of thicker material, being for the preferred embodiment of the invention roughly 25 mills thick, to provide the greater strength required for the seating flange, terminal retention area, and wire wrap tail. Except for a minor difference to be noted shortly, terminal retention area 32 and tail portion 34 are substantially the same as and perform substantially the same function as the corresponding elements in the embodiment of the invention shown in FIG. 2. Seating flange 48 is, however, somewhat different for the two embodiments of the invention. First, as may be best seen by comparing FIGS. 1 and 5, because of the difference in the manner in which the terminals are constructed, the seating flanges are turned 90° for the embodiment of the invention shown in FIG. 5 relative to the contact portion from their angle of FIG. 1. This permits the seating flange to be made slightly longer without causing adjacent seating flanges to touch, providing greater strength for the flanges. Since there may be printed circuit wiring on the board, the lower surfaces of the seating flange are tapered so that the added strength may be achieved without causing the seating flanges to touch, and possibly short circuit, adjacent printed circuit wiring.

While the cross-section of the terminal retention area 32 may be rectangular as shown in FIG. 7, for preferred embodiments of the invention, this area has an irregular cross-section such as is shown in FIG. 8. For reasons already described in detail with respect to the previous embodiment of the invention, this permits removal and reinsertion of a terminal while retaining good retention and antirotation characteristics. The cross-section of FIG. 8 also provides the knife edges desired for cutting cleanly into the board.

Figure 9:
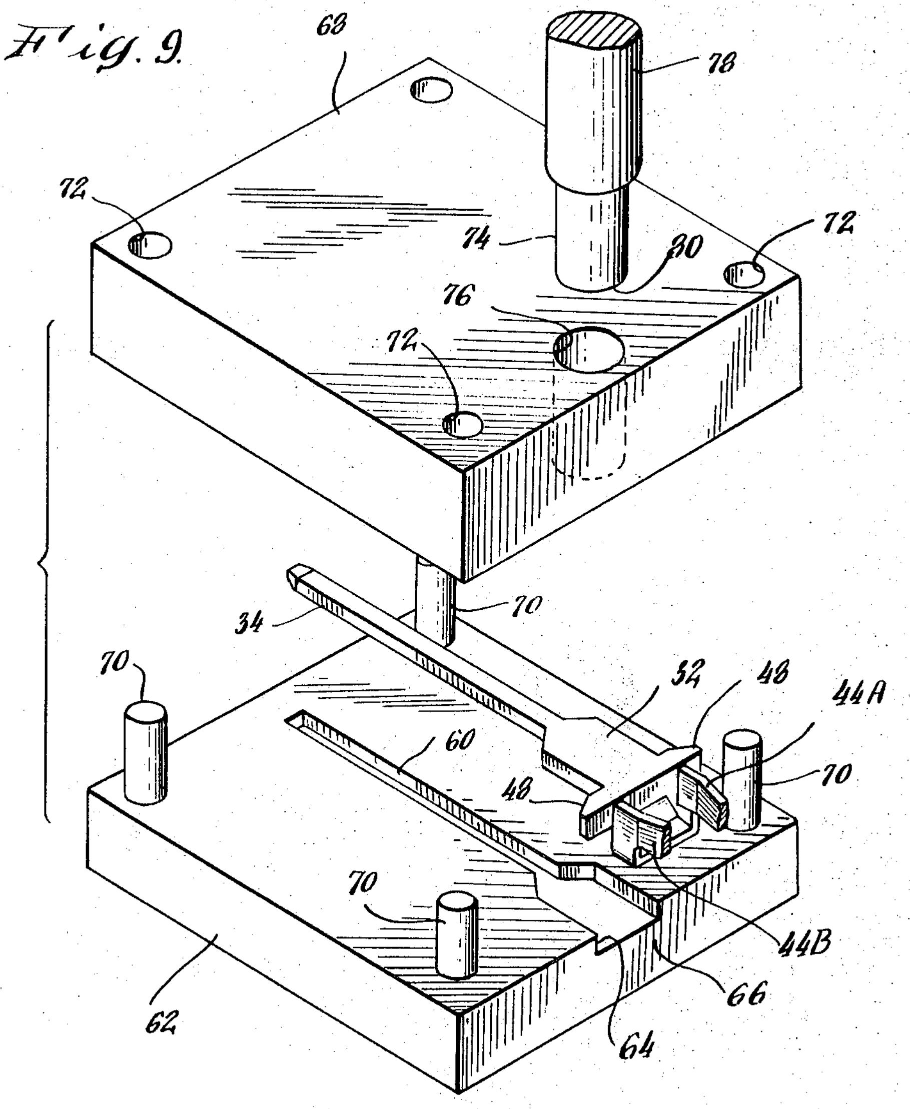
FIG. 9 is an exploded perspective view of a fixture suitable for use with terminals of this invention for enlarging the terminal's retention area.

FIG. 9 shows a fixture which may be utilized to permit the reinsertion of a terminal having a retention cross-section of the type shown in FIG. 7. The tail portion 34 of a terminal 14 is fitted in a groove portion 60 in a lower block 62 of the fixture. The dimensions of groove portion 60 are substantially identical to those of the tail portion providing a tight fit to properly orient the terminal in the block. Block 60 also has an enlarged groove portion 64 in which terminal retention area 32 is positioned. The width of this groove portion is somewhat greater than the terminal retention area so as to permit expansion of the terminal retention area in this dimension. With the terminal properly positioned in block 62, seating flange 48 butts against edge 66 of block 62 to further control the orientation of the terminal.

When the terminal has been properly positioned in block 62, block 68 is lowered into position. Pins 70 coacting with mating holes 72 may be utilized to properly orient blocks 62 and 68 with respect to each other. Punch 74 fits into hole 76 in block 68. The punch has an enlarged cap or collar 78 and a flat lower surface 80 which is of substantially the same diameter as the width of groove 64.

When the elements are properly assembled as indicated above, with surface 80 of punch 74 resting on the terminal retention area, cap or collar 78 is spaced a few thousandths of an inch above the upper surface of block 68. This effectively limits the penetration of the punch, providing for a controlled expansion of the terminal retention area. Cap 78 is then either manually struck with a hammer or the punch is automatically driven down by a suitable mechanism. When this occurs, the resulting impact on retention area 32 of the terminal in the fixture causes a deformation of this area which increases the areas width. Since the width of the terminal has been expanded, it may be reinserted in the board with good retention and antirotation characteristics. This relatively simple operation may be performed in the field, where required, and may normally be completed in just a few seconds.

A one-piece free standing terminal has thus been provided which is relatively simple and inexpensive to both manufacture and install. The terminal exhibits good terminal retention and antirotation characteristics, has a wide terminal receiving opening, and a resilient neck to compensate for slight terminal misalignment. In addition, it features a simple and inexpensive means for permitting terminal removal and reinsertion while still retaining good terminal retention and antirotation characteristics.

While preferred embodiments of the invention have been particularly shown and described above, it will be understood by those skilled in the art that the foregoing and other changes in form and detail may be made therein without departing from the spirit and scope of the invention.

I claim:

1. A method for inserting, removing and reinserting or replacing a nonrotable, free standing terminal in a terminal receiving opening of a circuit board without a significant decrease in terminal holding and antirotation characteristics, said method comprising:

inserting a one piece, free standing terminal having a contact portion at one end, a tail portion at the other end, and a terminal retention area of generally rectangular cross-section intermediate the two ends, in a terminal receiving opening of said circuit board, said terminal and opening being dimensioned so that upon insertion said terminal retention area coacts with and distorts said opening to cause the terminal to be frictionally and nonrotatably retained therein:

removing said terminal from said opening;

positioning a terminal which is to be inserted back into the distorted circuit board opening in first and second grove portions of a first block, said first groove portion receiving said tail portion and having substantially the same dimensions thereas, and said second groove portion receiving said terminal retention area and having substantially the same dimensions thereas except that the longer dimension of said rectangular cross-section is slightly wider to permit expansion of said retention area in that dimension;

mounting a second block on the first block to enclose the terminal, said second block having an opening formed therethrough located so as to be over said terminal retention area when the second block is mounted on the first block;

positioning a punch in the opening of said second block with its lower surface resting on said retention area, applying an impact force to said punch sufficient to expend said terminal retention area in said longer dimension;

and then inserting the terminal with the thus expanded longer cross-sectional dimension into the distorted opening of said board from which the terminal was removed whereby the expanded cross-sectional dimension of said terminal retention area will cause said circuit board opening to be further distorted so that the terminal will be frictionally retained therein without a significant decrease in retention and antirotation characteristics.

2. The invention in accordance with claim 1, wherein the step of applying an impact force includes limiting the penetration of said punch in response to said impact force.

3. The invention in accordance with claim 1, wherein said method includes the step of aligning said first and second blocks prior to application of said impact force.

* * * * *